July 9, 1957
C. A. REHBEIN ET AL
2,798,795
CATALYTIC CRACKING APPARATUS
Filed June 24, 1954
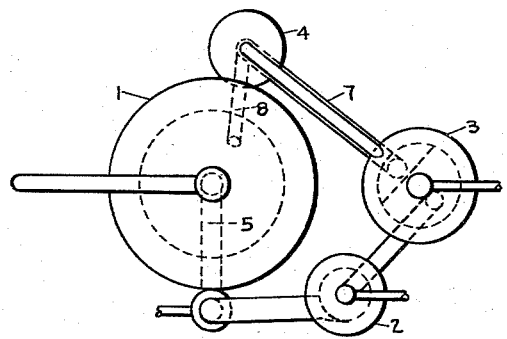
Fig. II
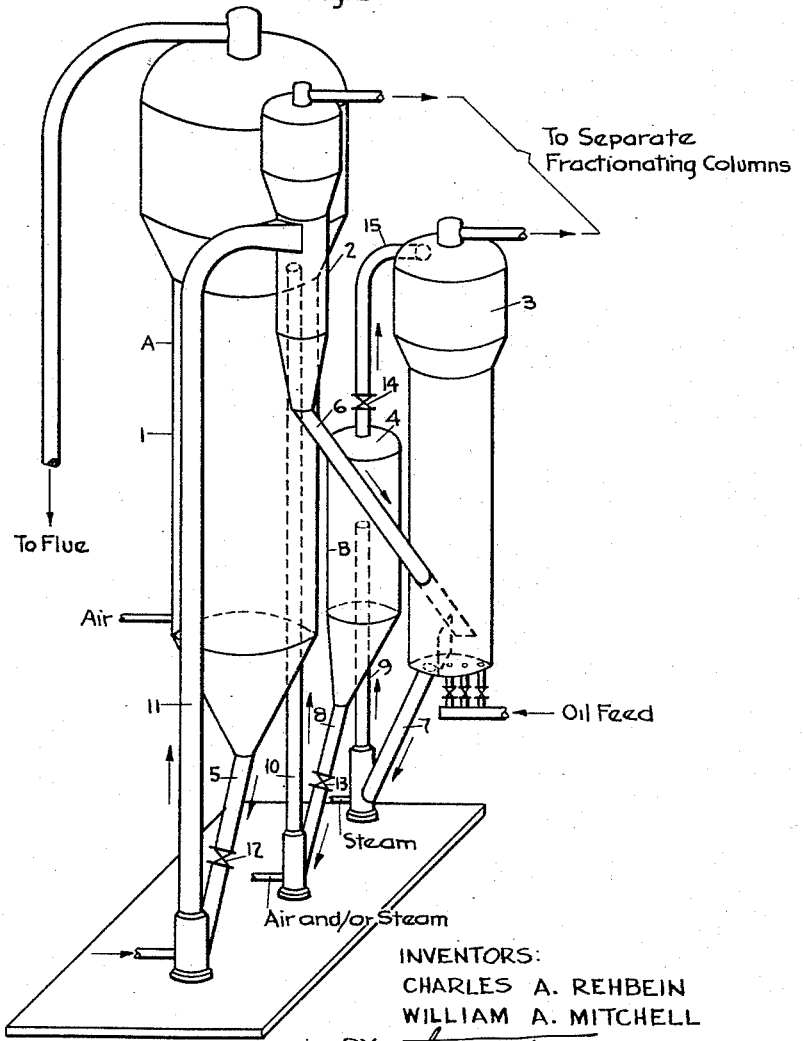
Fig. I
INVENTORS:
CHARLES A. REHBEIN
WILLIAM A. MITCHELL
BY: James Jodorvic
THEIR ATTORNEY

United States Patent Office 2,798,795
Patented July 9, 1957

2,798,795

CATALYTIC CRACKING APPARATUS

Charles A. Rehbein, New York, and William A. Mitchell, Bayside, N. Y., assignors to Shell Development Company, New York, N. Y., a corporation of Delaware Application June 24, 1954, Serial No. 439,045

5 Claims. (Cl. 23—288)

This invention relates to a new and improved fluidized catalyst catalytic cracking system having a novel arrangement of flows and essential component parts which is adapted to a specific type of operation allowing substantially increased optimum conversion levels, substantially increased gasoline yields, substantially increased product values, and substantially decreased coke makes.

The object of the invention is to provide a new and practical fluidized catalyst catalytic cracking system especially adapted for said specific type of operation.

In copending application, Serial No. 436,004, filed June 11, 1954, there is described a new catalytic cracking operation called "controlled catalytic cracking" which affords substantially increased optimum conversion levels, substantially increased gasoline yields, substantially increased product values, and substantially reduced coke makes. This type of operation cannot be carried out in the conventional catalytic cracking systems. The catalytic cracking as described below allows such operation to be carried out both practically and economically with a low capital expenditure and low operating cost. The system will be described in connection with the accompanying drawing.

Figure I of the drawing shows the arrangement of the main vessels and lines of the plant in oblique projection.

Figure II shows the plan of the arrangement.

Referring to Figure II, the arrangement is such that the catalyst cycles (counterclockwise in the particular case illustrated) through four vessels which are arranged more or less in a circle or rectangle. In making the circuit the catalyst undergoes a number of changes in elevation. In each case the raising of the catalyst to a higher point of elevation is effected in a confined vertical path in the form of a dilute suspension and horizontal movement around the circuit shown in the plan view is, in each case, effected by movement of the catalyst by gravity flow in an inclined confined path in the form of a dense (pseudo-liquid) phase.

Referring to Figure I the plant comprises four vertically disposed essentially cylindrical vessels 1, 2, 3, and 4 which are a fluid catalyst regenerator, a catalyst separator-hopper, a fluid catalyst reactor, and a fluid catalyst stripper, respectively. The separator-hopper vessel 2 is the most elevated of the vessels being approximately even with the top of the regenerator vessel. The reactor vessel is at a lower position and the stripper vessel is the lowest in elevation. Each of these vessels is provided at essentially the bottom thereof with an inclined standpipe 5, 6, 7, and 8, respectively, which standpipes are straight and inclined from the vertical from about 20° to about 45°.

Starting at the elevated separator-hopper vessel 2, the catalyst descends by gravity as a dense (pseudo-liquid) stream by the inclined pipe 6 which debouches into the bottom of the reactor vessel 3, thereby traversing one leg of the horizontal path of travel. From here, the catalyst again descends by gravity flow as a dense (pseudo-liquid) stream by the inclined pipe 7 to a position which in plan is directly under the stripper, thereby traversing a second leg of the horizontal path of travel. It is then raised into the stripper vessel by vertical line 9. The catalyst then flows by gravity and as a dense phase by inclined line 8 to a position which in plan is under the regenerator, thereby traversing a third leg of the horizontal path of travel. After being raised into the regenerator by vertical line 10, it again flows by gravity in the dense phase through inclined pipe 5 to a point which is approximately under the separator-hopper vessel 2. From this point it is raised to the hopper-separator by line 11 which is vertical except for the bend at the top which is necessary to enable tangential entry into this vessel. Thus, the catalyst flows by gravity and in the dense phase through inclined lines to complete the circuit and at intermediate points is raised through vertical lines.

The vertical lines 9 and 10 extend up into the stripping vessel and regeneration vessel, respectively, to a height above the levels of the fluidized catalyst beds in these vessels indicated at levels A and B, respectively. These lines therefore debouch into the upper or disengaging space of these vessels. These lines 9 and 10 and also line 11 are constructed of such diameter that at the flow rate for which the plant is designed the linear velocity therein is well above the critical velocity. The critical velocity is the superficial velocity above which a so-called dense or pseudo-liquid catalyst phase cannot separate. Also, they are constructed to be as straight as possible and substantially vertical. The standpipe lines 5, 6, 7, and 8, which are inclined at an angle up to 45° from the vertical, operate with the catalyst always flowing by gravity as a dense or pseudo-liquid phase.

In order to obtain a proper pressure balance so that circulation of the catalyst may be effected, it is necessary that inclined line 6 debouch near the bottom of the reactor substantially as illustrated. Standpipe control valves 12 and 13 are required only on the stripper and regenerator standpipes. The other inclined standpipes require no such valve. A back pressure valve 14 is required in the vapor effluent line 15 of the stripper.

Only the important lines and features of the arrangement are illustrated in the drawing. Actually, all four of the vessels are provided near the top with suitable cyclone separators of conventional design having depending dip legs. Also, there are vapor distributors, e. g., perforated pipe distributors, at the bottom of the cylindrical parts of the regenerator and stripper vessels for the introduction and distribution of air and stripping steam, respectively. For the sake of clarity and simplification these and other conventional features are not illustrated in the drawing. It is to be understood however that these features, as well as various minor valves, aeration lines, control instruments, and the like auxiliary equipment will normally constitute part of the plant.

While the vessels are arranged in a quadrangle in the case illustrated, and this is the preferred form, it is possible to construct the separator-hopper vessel wholly or partly within the upper shell of the reactor, thereby placing the vessels in a triangular plan with the separator-hopper vessel directly above the reaction zone. In this arrangement it is essential, as in the described case, that there be no communication between the two vessels except through the catalyst line 6 debouching near the bottom of the reactor.

The particular arrangement described is applicable and advantageous for the controlled catalytic cracking of hydrocarbon oils in the manner described in the above-mentioned copending application to which reference may be had for details as to the processing conditions used.

The invention claimed is:

1. Apparatus for the catalytic cracking of hydrocarbon oils comprising in combination a fluidized catalyst regenerator vessel, a separate catalyst separator-hopper vessel, a separate catalyst stripper vessel, and a separate fluidized catalyst reactor vessel, each essentially vertically disposed and arranged in plan in a quadrangle, said catalyst separator-hopper vessel being provided with a standpipe line debouching within said fluidized catalyst reactor near the bottom thereof, said fluidized catalyst reactor being provided with an inclined standpipe line communicating at an acute angle with a substantially vertical riser line which latter debouches within said stripper vessel above the normal catalyst bed height therein, said stripper vessel being provided with an inclined standpipe line provided with a flow control valve and communicating at an acute angle with a substantially vertical riser line debouching within said fluidized catalyst regenerator vessel above the normal catalyst bed height therein, and said fluidized catalytic regenerator vessel being provided with an inclined standpipe having a flow control valve and communicating at an acute angle with a substantially vertical riser line debouching within said catalyst separator-hopper vessel thereby to complete a cycle path for catalyst flow.

2. Apparatus according to claim 1 further characterized in that the said standpipe line of the separator-hopper vessel and said inclined standpipe of said fluidized catalyst reactor arranged to allow free unrestricted flow of dense phase catalyst therethrough.

3. Apparatus according to claim 1 further characterized in that said stripper vessel is located at a still lower elevation than said reactor vessel and is provided with a top vapor withdrawal line debouching into the said reactor vessel near the top, said line being provided with a constant back pressure control valve.

4. Apparatus according to claim 1 further characterized in that the standpipes of all the said vessels for the withdrawal of catalyst from said vessels are connected to said vessels essentially at the bottoms thereof.

5. Apparatus according to claim 1 further characterized in that said reactor is provided with means for injecting oil to be cracked directly into said reactor near the bottom thereof independent of said separator-hopper standpipe.

References Cited in the file of this patent

UNITED STATES PATENTS

| | | |
|---|---|---|
| 2,414,002 | Thomas et al. | Jan. 7, 1947 |
| 2,497,940 | Hemminger | Feb. 21, 1950 |
| 2,581,135 | Odell | Jan. 1, 1952 |
| 2,673,832 | Lassiat | Mar. 30, 1954 |
| 2,684,890 | Lapple | July 27, 1954 |
| 2,684,931 | Berg | July 27, 1954 |